Patented Jan. 29, 1946

2,393,625

UNITED STATES PATENT OFFICE 2,393,625

PRODUCT AND METHOD OF FORMING A PRECIPITATED MAGNESIUM SILICATE ADSORBENT AGENT

Ogden Fitz Simons, Glenside, Pa., assignor to Floridin Company, Warren, Pa., a corporation of Delaware No Drawing. Application September 13, 1941, Serial No. 410,772

6 Claims. (Cl. 252—269)

This invention relates to the preparation of a magnesium silicate, and more particularly to a precipitated magnesium silicate which may be made to serve as an adsorbent agent.

It is an object of this invention to provide a method of producing a precipitated magnesium silicate gel.

It is another object of this invention to provide steps for activating the precipitated magnesium silicate gel.

Another object of the invention is to provide an improved magnesium silicate adsorbent agent.

I have found that the improved hydrated magnesium silicate produced in accordance with this invention is of such hardness that it may be readily granulated and of such high adsorbency that it may be used in the decolorization of oils, fats and waxes and is also valuable for its selective adsorption of vitamins, hormones, dyes and many other compounds.

It has been proposed in the past to react a magnesium salt with a silicate, in a concentrated slurry, to precipitate a magnesium silicate, which precipitate has been treated in various ways to provide a filter medium for decolorizing oil and other analogous uses.

The present invention is an improvement on these prior art inventions and broadly resides in separately forming a solution of a soluble magnesium compound in water and a solution of a soluble silicate compound in water. The solutions are then rapidly intermixed, the silicate compound being continuously added to the magnesium compound to insure that there will always be an excess of magnesium ions present in the solutions being mixed. The water used to form the solutions may be divided in any proportion between the silicate and magnesium solutions, but the total dissolved solid content in the mixed solutions is governed so that the magnesium silicate is formed in a quite dilute solution. The magnesium silicate, being insoluble, will be precipitated and may be separated from the water and washed to remove any soluble salts entrained with the precipitate.

A further teaching of the present invention involves the control of the temperature of the reacting solutions to always maintain it below that temperature which will cause flocculation. If such control is established, the magnesium silicate precipitate will retain a gel formation, the gel being washed and rapidly activated to provide a superior adsorbent product.

Rapid activation also contributes to the efficiency of the final product, and it has been found that before the precipitated gel is subjected to such activation, the mechanical removal of a certain amount of the water mixed with the gel is necessary. This water may be mechanically removed on a suction or pressure filter, the suction or pressure being applied until the gel cake cracks or the desired dryness is reached. The gel cake is then rapidly activated by the removal of moisture as rapidly as possible. The rapid removal of moisture produces an adsorbent material having a great porosity by minimizing shrinkage which tends to destroy the porosity of the product. In using a high temperature to aid moisture removal, it is important that the skin or surface temperature of the material never exceeds substantially 1300° F., for otherwise the degree of heat might cause injury by sintering the precipitate being dried.

The rapidly activated product is then ready for crushing and use. After crushing, the unitary granules are each a homogeneous mass having a high degree of porosity with the pores extending into the internal phases of the mass. The product is quite hard and readily able to withstand all ordinary usages in industry and has a high decolorizing efficiency as compared to commercially available prepared fuller's earth. In the preferred form, the activated product will have a moisture content of about 1 to 2% combined water, and may be reactivated after use as handily as known adsorbents.

In the practice of this invention, soluble magnesium compounds, such as magnesium sulphate, magnesium citrate, magnesium acetate, magnesium chloride, or any other such soluble form of magnesium, may be used. Sodium silicate has been found to provide a very satisfactory source of the silicate radical, but other soluble silicates may be used. In the typical example set forth to illustrate this invention, dilute solutions of $MgSO_4$ and sodium silicate are prepared.

The dilution of the solutions, which are mixed, has been found to have an important bearing upon the hardness of the final product, and where magnesium sulphate and sodium silicate are the compounds being reacted, a total dissolved solid content of 7.8% by weight in the mixed solutions has been found to give the most satisfactory final product. The water of solution may be divided in any proportion between the reacting compound, it being important only that the total dissolved solid content proportioned as between magnesium and silicate as needed for the reaction be no greater than 7.8%. If a too concentrated solution is used in the reaction, the final product loses its hardness, which interferes with its use as a percolation adsorbent. It is important to note, however, that mere loss of hardness does not seem to injure the efficiency of the product as an adsorbent medium. Although the preferred concentration has been given above, in practice, a very satisfactory product will result if any of the following proportions are used:

150 cc. of "S" silicate ($NaO_2:SiO_2=1:3.9$ and having a Baumé gravity of 33.5° which gives an analysis of 68.9% water, 24.7% silicate, and 6.4% sodium oxide)
50 grams of $MgSO_4.7H_2O$
1.3 to 5 liters of water The water may be equally divided between the magnesium and silicate to form the separate solutions before mixing. If a lesser amount of water is used, the hardness in the final product falls off quite rapidly, but on the other hand, if more than 5 liters of water are used with the above amounts of silicate and magnesium, while the hardness falls off, it does so very slowly.

As stated above, the solution containing the sodium compound is added to the solution containing the magnesium compound to insure that in the resulting mixture of solutions, there will always be present an excess of magnesium ions. This causes a pure magnesium silicate to be precipitated, the precipitate being free of silicic acid and unreacted silicate which otherwise might be present if the reverse order of mixture were followed.

The sodium solution may be added to the magnesium solution as rapidly as possible, the speed of addition being controlled merely by the shape of the container in which the mixing is performed and the quantities of materials being mixed. The magnesium silicate precipitate is formed substantially instantaneously, and if agitation is used, the rate of addition may be materially speeded up. Times of between 3 to 20 minutes have been used, and good results have always been obtained by completing the mixing within 4 to 5 minutes.

Control of the temperature at which the solutions are mixed has been stated to be an important factor in the proper performance of the present method, and it has been found that when magnesium sulphate and sodium silicate are reacted in accordance with the present teaching, that a temperature in excess of 150° F. will cause the precipitated magnesium silicate gel to flocculate. The flocculation of the gel precipitate is dependent upon the temperature and amount of electrolytes present in the solution, and, therefore, the solutions are preferably mixed when at or near the freezing temperature of the solutions. However, any higher temperature may be used as long as it is below that temperature which will cause flocculation, and in practice, this should be something below 100° F.

The magnesium silicate gel precipitate formed by reacting the dilute solutions of magnesium and silicate compounds, after being separated from the final reaction solution, is washed, the wash water being supplied at a temperature below that which will cause flocculation. Because the flocculation temperature of the gel is a function of the electrolytes present, it is apparent that after the first washing, which should be carried out at a temperature below 100° F., a large proportion of the electrolytes will have been removed, and, therefore, the second wash may be carried out at a somewhat higher temperature, if desired. As the electrolytes and other soluble impurities are removed from the precipitated gel, the temperature of the wash water may be increased in each of the successive stages of washing. The precipitate should be washed to be substantially free of all impurities, but a small amount of sodium sulphate salt, for example, will have no detrimental effects, and four washes will generally be found to be sufficient.

The washed precipitate is then placed on the suction filter where a portion of the water is mechanically separated so that the gel has about 80 to 95% volatile content on a calcined basis. The amount of water removed at this stage is controlled to determine the density of the final product. It has been found drying mechanically to approximately 87% moisture produces the best results. A higher solid content produces a denser adsorbent material having a lower efficiency, and if less water is removed, while the efficiency of the adsorbent material will be very good, the final product will be quite fluffy and will require a larger volume of filter space to accomplish the same amount of work done by the product resulting from drying from 87% moisture. Also, the less dense product is somewhat more friable and, therefore, its commercial value is not so great.

The gel cake partially dried on the suction filter is then rapidly activated by removing the moisture from the gel cake as rapidly as possible. This is desirable because as stated above, when it is dried rapidly, the porosity of the ultimate product is insured, and it is this porosity which determines the ability of the precipitated gel to act efficiently as an adsorbent agent. One method of rapidly activating the gel is to place it in a muffle oven in a relatively thin layer, the oven being maintained at a temperature between 1200° and 1300° F. The magnesium silicate gel is permitted to remain in this oven until the entire layer has been heated through and attains a temperature uniform with that of the oven, at which point it will have been dried to approximately 1 to 2% combined moisture. The gel cake thus rapidly activated is then removed from the oven.

The temperature of the gel should not be raised above 1300° F. in any drying process to which the gel is subjected, because to do so would cause sintering which would injure the structure of the precipitated gel being dried. Thus the gel could be dried in an oven with the initial temperature to which it is subjected being around 1800° F., the evaporation from the gel itself preventing its temperature rising above 1300° F. As the drying progresses and the rate of evaporation is reduced, the temperature of the drying gases must be lowered below 1300° F. to avoid harmful sintering. The rate of drying obtained in a muffle furnace at a temperature of 1300° F. with a thin layer of gel is equivalent approximately to the removal of 250 gallons of water per ton of precipitate dried per hour. Rates equivalent to this quantity removal of water per unit time may be obtained at lower temperatures where drying gas treatments are used.

As a typical example of one method of performing the present invention, one kilogram of $MgSO_4.7H_2O$ may be dissolved in 60 liters of water at 45° F. A separate solution of sodium silicate having a proportion of sodium oxide to silicate of 1 to 3.9 and having a Baumé gravity of 33.5° is separately dissolved in 60 liters of water at 45° F. The sodium solution is rapidly run into the magnesium solution accompanied by agitation, and the complete addition may be accomplished in 4 to 5 minutes. The temperature of the reaction is controlled by the temperature of the solutions before mixing; in any event, however, the temperature of the reaction must not rise to that which will cause flocculation. The magnesium silicate gel will be rapidly precipitated and may be filtered or centrifuged out of the resulting final mixture. This gel precipitate is then washed in 80 liters of cold water at a temperature below 100° F., and after several washes, is dried to approximately 13% solid content by weight on a calcined basis, after which it is rapidly activated in a muffle oven at a temperature of approximately 1200° F. as above explained.

When dried to the desired extent, the magnesium silicate is crushed to the appropriate size range and the preferred size for the percolation treatment of petroleum oils is 30 to 60 mesh. The crushed material is then screened and is ready for use in a percolation process for decolorizing oil. A dried magnesium silicate gel produced as above described has an efficiency of between 2 to 3 times that of a corresponding quantity of prepared Florida fuller's earth.

It has been stated above that magnesium chloride can be used in the formation of this precipitated magnesium silicate gel. When this compound is used, the chloride ion must be completely removed from the precipitate. It has been found that even in minute quantities, this ion has a deleterious effect upon the efficiency of the filter medium. No other ion has been found to have this result, and indeed, the sulphate ion, if present along with the chloride ion, destroys this effect of the chloride ion and renders the dried adsorbent magnesium silicate precipitate equally as effective as that produced with $MgSO_4.7H_2O$, notwithstanding the presence of a small percentage of chloride ions in the precipitate.

After the washing step described above, instead of being rapidly activated, the gel may be dried by mere exposure to air, and when substantially dry, may be ground to a fineness of 200 mesh. Such a product can be used effectively in the contact process of decolorizing oil, and it is believed that the fine grinding gives a large area of fractured surfaces which are available to decolorize the oil.

After use in the percolation or contact process, the adsorbent material may be reactivated by heating to a temperature of 1300° F., and this material may be reused many times without a serious loss in efficiency.

The hydrated magnesium silicate produced in accordance with this invention, as previously explained, has a hardness when granulated and a high adsorbency effective when used in conventional percolation or contact processes to efficiently decolorize oils, fats and waxes and is also valuable for the selective adsorption of vitamins, hormones, dyes and many other compounds.

This application is a continuation-in-part of my copending application Serial No. 400,326, filed June 28, 1941.

I claim:

1. The process of making a hard, granulated highly porous magnesium silicate adsorbent suitable for percolation treatments, which comprises adding an aqueous solution of an alkali silicate to an aqueous solution of a soluble magnesium compound, the total solids content of the mixture of the two solutions being not greater than about 7.8%, maintaining an excess of magnesium ions in the resulting mixture of solutions while reacting said solutions, and reacting said solutions at a temperature not in excess of 150° F. to form a precipitated gelatinous magnesium silicate, separating the gelatinous precipitate, partially dewatering the gel, drying and activating said gel by removing substantially 250 gallons of water per ton of precipitate dried per hour until a dry grindable mass is obtained, and grinding said mass.

2. The process of making a hard, granulated highly porous magnesium silicate adsorbent suitable for percolation treatments, which comprises adding an aqueous solution of an alkali silicate to an aqueous solution of a soluble magnesium compound, the total solids content of the mixture of the two solutions being not greater than about 7.8%, maintaining an excess of magnesium ions in the resulting mixture of solutions while reacting said solutions, and reacting said solutions at a temperature not in excess of 150° F. to form a precipitated gelatinous magnesium silicate, separating the gelatinous precipitate, partially dewatering the gel, drying and activating the said gel by heating in air at about 1200° F. to 1300° F. until a dry grindable mass is obtained, and grinding said mass.

3. The process of making a hard, granulated highly porous magnesium silicate adsorbent suitable for percolation treatments, which comprises adding an aqueous solution of an alkali silicate to an aqueous solution of a soluble magnesium compound, the total solids content of the mixture of the two solutions being not greater than about 7.8%, maintaining an excess of magnesium ions in the resulting mixture of solutions while reacting said solutions, and reacting said solutions at a temperature not in excess of 150° F. to form a precipitated gelatinous magnesium silicate, separating the gelatinous precipitate, dewatering the gel, drying and activating the gel by heating the same at elevated temperature in the presence of air until a dry, grindable mass is obtained, and grinding said mass.

4. A hard, granular highly porous magnesium silicate adsorbent suitable for percolation treatments and prepared by the process of claim 1, said adsorbent being susceptible of regeneration at temperatures up to 1300° F. without substantially impairing its adsorbent capacity.

5. A hard, granular highly porous magnesium silicate adsorbent suitable for percolation treatments and prepared by the process of claim 2, said adsorbent being susceptible of regeneration at temperatures up to 1300° F. without substantially impairing its adsorbent capacity.

6. A hard, granular highly porous magnesium silicate adsorbent suitable for percolation treatments and prepared by the process of claim 3, said adsorbent being susceptible of regeneration at temperatures up to 1300° F. without substantially impairing its adsorbent capacity.

OGDEN FITZ SIMONS.